(12) United States Patent
Crowe et al.

(10) Patent No.: US 6,811,307 B2
(45) Date of Patent: Nov. 2, 2004

(54) DTS MEASUREMENT OF HV CABLE TEMPERATURE PROFILE

(76) Inventors: Kenneth J. Crowe, 8214 Westchester Ste. 500, Dallas, TX (US) 75225; Albert van der Tuuk, Zuidelijk Halfrond 11 P.O. Box 325, Gouda (NL), 2800 AH; Willem Griffioen, Hoogerheijdestraat 180, Delfzijl (NL), 9933 AF (*) Notice: Subject to any disclaimer, the term of this patent is extended or adjusted under 35 U.S.C. 154(b) by 0 days.

(21) Appl. No.: 10/618,100

(22) Filed: Jul. 10, 2003

(65) Prior Publication Data

US 2004/0091015 A1 May 13, 2004

Related U.S. Application Data

(60) Provisional application No. 60/395,148, filed on Jul. 10, 2002.

(51) Int. Cl.[7] .................................. G01J 5/08; G01K 13/00
(52) U.S. Cl. .................. 374/131; 374/141; 250/227.14; 356/44
(58) Field of Search ............................ 374/130, 131, 374/141, 147, 148, 161; 250/227.14, 227.17, 227.18, 227.19; 356/44, 301

(56) References Cited

U.S. PATENT DOCUMENTS

| | | |
|---|---|---|
| 4,151,747 A | 5/1979 | Gottlieb et al. |
| 4,203,326 A | 5/1980 | Gottlieb et al. |
| 4,298,794 A | 11/1981 | Snitzer et al. |
| 4,316,388 A | 2/1982 | Miller et al. |
| 4,362,057 A | 12/1982 | Gottlieb et al. |
| 4,508,461 A | 4/1985 | Lambert |
| 4,691,896 A | 9/1987 | Reeve et al. |
| 4,823,166 A | 4/1989 | Hartog et al. |
| 4,850,569 A | 7/1989 | Griffioen et al. |
| 4,934,662 A | 6/1990 | Griffioen et al. |
| 5,004,913 A | 4/1991 | Kleinerman |
| 5,178,465 A | 1/1993 | Amano et al. |
| 5,197,715 A | 3/1993 | Griffioen |
| 5,211,377 A | 5/1993 | Griffioen et al. |
| 5,217,306 A | 6/1993 | Wada |
| 5,283,429 A | 2/1994 | Campolo |
| 5,292,196 A | 3/1994 | Iida et al. |
| 5,308,041 A | 5/1994 | Griffioen et al. |
| 5,474,277 A | 12/1995 | Griffioen |
| 5,600,248 A | 2/1997 | Westrom et al. |
| 5,639,183 A | 6/1997 | Griffioen et al. |
| 5,645,267 A | 7/1997 | Reeve et al. |
| 5,696,863 A | 12/1997 | Kleinerman |
| 5,825,804 A | 10/1998 | Sai |
| 5,884,384 A | 3/1999 | Griffioen |
| 5,897,103 A | 4/1999 | Griffioen et al. |
| 6,047,954 A | 4/2000 | Griffioen |
| 6,129,341 A | 10/2000 | Griffioen et al. |
| 6,350,056 B1 | 2/2002 | Helmig et al. |
| 6,380,534 B1 | 4/2002 | Farhadiroushan et al. |
| 6,388,434 B1 * | 5/2002 | Davidson et al. ...... 250/227.17 |

* cited by examiner

*Primary Examiner*—G. Bradley Bennett
(74) *Attorney, Agent, or Firm*—Dennis T. Griggs

(57) ABSTRACT

A fiber optic cable is used as a distributed temperature sensing (DTS) transducer for temperature profile measurements in a protective underground duct in which a high voltage (HV) cable has already been laid. The sensing cable is not incorporated into the power cable itself, and in some installations does not have direct physical contact with the HV cable. The sensing cable is installed externally (along side) of the HV power cable, either in direct surface contact with the HV cable, or alternatively, the fiber optic sensing cable is installed in a small diameter guide tube that is placed in the upper annulus between the HV cable and the protective duct. The sensing fiber and one or more guide tubes are installed in a loose bundle at least in part by fluid drag forces (blowing with pressurized air) using conventional cable launching equipment. Large diameter guide tubes are placed on opposite sides of the HV cable in a wedging position that blocks shifting movement of the small guide tubes and optical fibers down into the lower cusp-shaped space between the HV cable and the protective duct.

5 Claims, 3 Drawing Sheets

DTS MEASUREMENT OF HV CABLE TEMPERATURE PROFILE

RELATED APPLICATION DATA

This application is a continuation of U.S. Provisional Application No. 60/395,148 filed Jul. 10, 2002 which is hereby incorporated by reference. The Applicants claim, as to the prior application, the right of priority pursuant to the Paris Convention and 35 U.S.C. 119.

FIELD OF THE INVENTION

This invention relates generally to high voltage cable systems, and in particular to method and apparatus for installing fiber optic cables to be used as distributed temperature sensing transducers for temperature profile measurements in an underground protective duct in which a high voltage cable has already been installed.

BACKGROUND OF THE INVENTION

The safe working temperature range of cable insulation determines the maximum current loading for most high voltage underground cable systems. Although the thermal performance of cable insulation can be reliably modeled, the thermal parameters of the environments in which cables operate are variable and unpredictable. The environment external to a HV cable transmission system plays a significant role in transferring heat away from cables and is therefore critical to the current capacity rating of cables.

Nearby heat sources, e.g., other cables, road surfaces and other outside plant utility components, will further affect the heat transfer rate and therefore the current rating of the HV cable system. Some unpredictable parameters include: ground ambient temperature, which may change both daily and seasonally, and ground thermal resistivity, that may vary greatly from worst case (dried-out) to best case (wet) conditions.

Generally, the worst-case thermal conditions are not realized in practice and the actual cable current capacity for a particular installation is usually higher than the theoretical design. However, under exceptional circumstances, unforeseen adverse thermal conditions in the cable environment could result in the safe loading being lower than the theoretical design, leading to thermal runaway of the cable and failure of connected loads. Monitoring the temperature profile of the installed HV cable and its environment, plus intelligent processing of the data, can provide early warning of a dangerous operating condition, thus allowing utility operators to take corrective action through up-grading and retrofitting, enabling optimum and safe thermal cable loading to be achieved. For these reasons monitoring of HV cable temperature profiles is of considerable interest to the electric utility operators.

The reality faced by the modem power distribution industry is that equipment more and more is being operated near its maximum current and voltage ratings. Along with these operating conditions comes an increase in unwanted heating of components, including in particular, conductor insulation. The reliability, maintenance and operation life of a high voltage cable are directly affected by its operating temperature. When this temperature exceeds a certain value for any appreciable period of time, it's useful life rapidly decreases.

Information as to "hot spots" and "over-temperature" conditions existing in the HV cable may indicate improper operation, defective components, degradation of insulation, or even possible failure such as short circuit or flash over. Gathering that information, however, is difficult, since the cable is buried underground and operated at very high potentials relative to ground. This high voltage, or its associated electromagnetic interference, hampers measurement of temperature directly on the conductors and makes use of metallic probes ill advised. For one reason, connections or contacts involving metallic conductors or probes are susceptible to dangerous flash-overs. Also, any currents induced in a metallic point temperature sensor (thermocouple) by the high potential could interfere with accurate temperature measurement.

Electric utility companies would like to be able to measure the temperature along the entire length of the HV cable route in order to detect hot spots (areas where the temperature exceeds the safe operating range) that could damage the cable and cause power outages. Optical fibers are now being integrated in most new high voltage cable systems to obtain a distributed temperature profile of the cable serving under load and no-load conditions. Capability of present distributed temperature sensing (DTS) systems allow fiber loop lengths of up to around 12 km for multimode fiber, giving a measurement accuracy of +/−10C. For lengths up to around 30 km, single mode fiber can be used with the same accuracy but with a 3-meter resolution rather than the 1-meter resolution possible with the multimode system. Those systems use a DTS (Distributive Temperature Sensing) unit to send a pulse of laser light through the fiber optic cable and then use a certain light scattering phenomenon that varies with temperature in order to indicate within a few degrees what the temperature is along a specific distribution route.

According to that phenomenon, the intensity ratio between a Stokes line and an anti-Stokes line (which are two components of Raman scattering light) changes sensitively depending on a temperature of an optical fiber. In the measurement, a light pulse is transmitted into the optical fiber, and a time (a delay time until Raman back scattering light returns to a transmitting end of the optical fiber) is measured to determine a position at which the scattering light is generated. The temperature of the optical fiber at that position can be determined by a comparison of the intensity ratio at various points along the sensing cable with the intensity ratio at the sending station where the temperature is known. By detecting the Raman back scattering light from respective positions along the optical fiber on the time division basis, the temperatures at respective positions along the optical fiber, that is, a temperature distribution along the optical fiber can be obtained.

Traditionally, the utility operator would instruct the cable manufacturer to modify the HV cable by installing a small stainless steel tube inside that contains one or more single mode (SM) or multimode (MM) optical fibers. The DTS unit is then connected to the optical fiber and the measurements are taken. There are a number of limitations on this method. The cable is enlarged in diameter to accommodate the steel tube and so is more difficult to install. In addition, the physical pounding that the cables take during installation can also damage the fibers, thus rendering the entire cable out of allowable performance specifications thus resulting in significant expenses to the cable installer, manufacturer and the utility company as well.

Substantial difficulties have been encountered in installing the optical fiber cables in HV ducts in which HV cable has already been installed because of the irregular, high friction surfaces encountered in the duct space. It is therefore desirable to provide improved methods to install optical fiber DTS sensing cable in new HV cable installations as well as during retrofit of older installations, so that the HV cable temperature profile along the entire HV cable run can be monitored.

SUMMARY OF THE INVENTION

The present invention provides a cost-effective method to install one or more fiber optic cables in a protective underground duct in which a high voltage cable has already been placed into operation, and so may present variations in the coefficient of friction (COF) on the inside of these ducts that hinder retrofit installation. According to this retrofit method, the fiber cable is not incorporated into the power cable itself, and in some installations does not have direct physical contact with the HV cable.

The insight of the invention is that integration with the HV cable or direct contact of the temperature sensing optical fiber against the HV cable surface is not required for reliable temperature measurements. To the contrary, it is sufficient that the sensing fiber need only be present in the protective duct space, and not in direct contact with the HV cable. This is because the interior space of the protective duct stabilizes at or very near the local HV cable temperature. Even if the sensing fiber is enclosed in a guide tube, upon thermal stabilization, it will nevertheless still accurately sense the HV cable temperature by heat transfer through the guide tube sidewall.

The sensing fiber cable is installed externally to (along side) the HV power cable, either in direct surface contact with the HV cable, or alternatively, the fiber optic cable is installed in a small diameter guide tube that is located in the protective duct space between the HV cable and the protective duct. According to one aspect of the invention, the sensing fiber and one or more guide tubes are installed in a loose bundle at least in part by fluid drag forces (pushing and blowing with pressurized air) using conventional cable launching equipment.

Prior to installation of the optical fibers and small guide tubes, a pair of large diameter guide tubes is placed in the duct annulus by pulling the guide tubes with a rope. The large diameter guide tubes are placed on opposite sides of the HV cable in a wedging position that blocks downward shifting movement of the small guide tubes and optical fibers into the lower cusp-shaped annulus.

This blocking action is needed because otherwise the optical fibers would be pinched or crushed by flexing movement of the HV cable as it reacts to electromagnetic forces caused by rapid changes in the electromagnetic field surrounding the cable, for example while undergoing rapid changes in operating voltage incidental to start-up or sudden load fluctuations. The large diameter guide tubes, in combination with the top surface of the HV cable and the inner bore of the protective duct, form a low friction longitudinal passage for receiving and guiding the optical sensing fibers and guide tubes as they are blown through the protective duct by pressurized air.

After the optical fiber has been installed, DTS analytical software is used to perform the Raman back scattering analysis to give the desired temperature profile analysis. This saves the utility company and cable manufacturer a significant amount of direct costs as well as risk cost.

These optical fibers are pig-tailed to allow the DTS unit to be directly plugged into the fiber at manhole inspection stations along the route. From that point, the data is sent by SCADA or wireless transmission directly to controllers monitoring the system.

DETAILED DESCRIPTION OF THE PREFERRED EMBODIMENT

Figure 1:
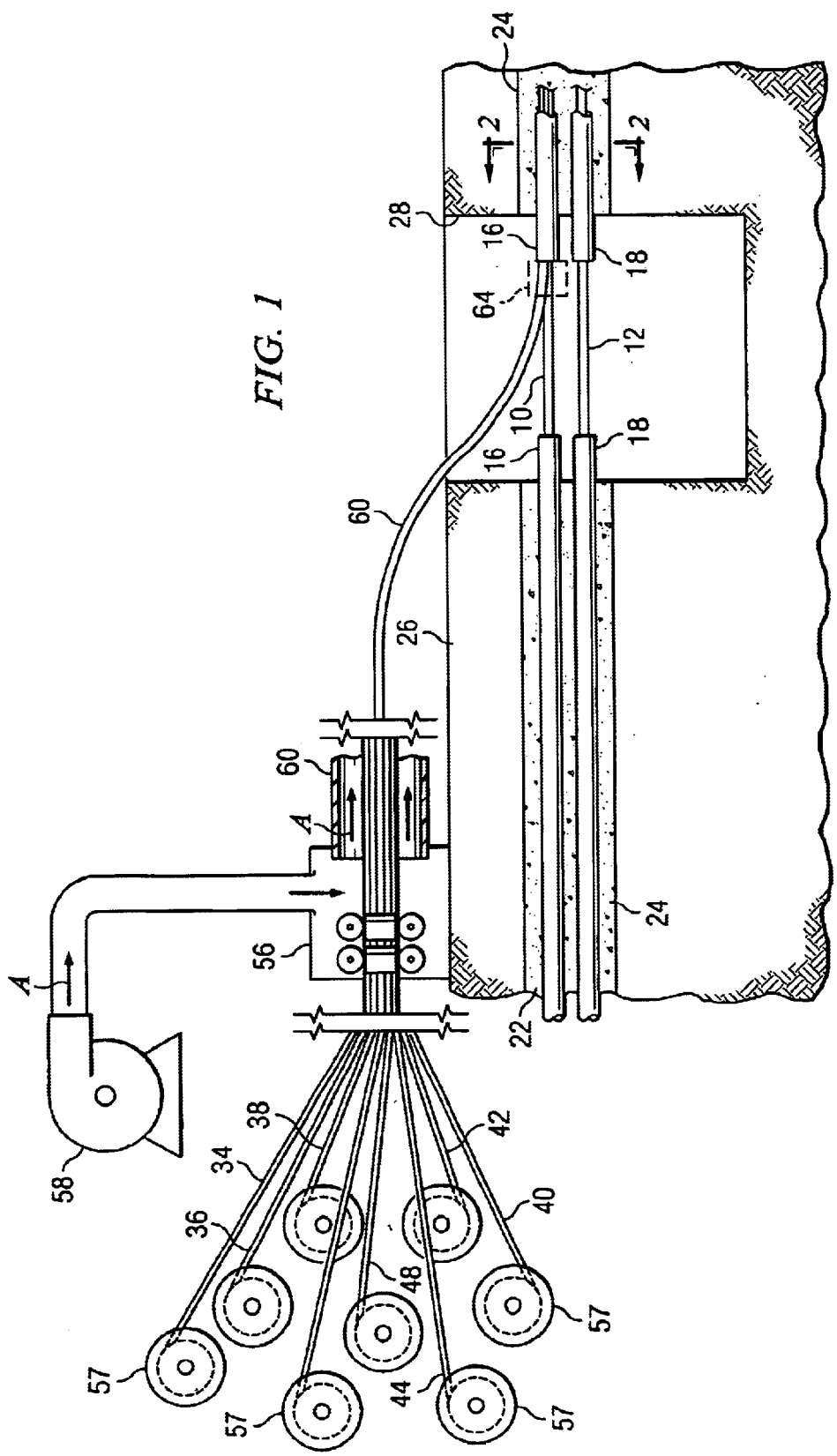
FIG. 1 is a simplified elevational view, partly in section, of a typical underground HV cable installation in which cable-launching equipment is installing fiber optic cables and guide tubes in a protective underground duct in which a HV cable has already been installed.
Figure 2:
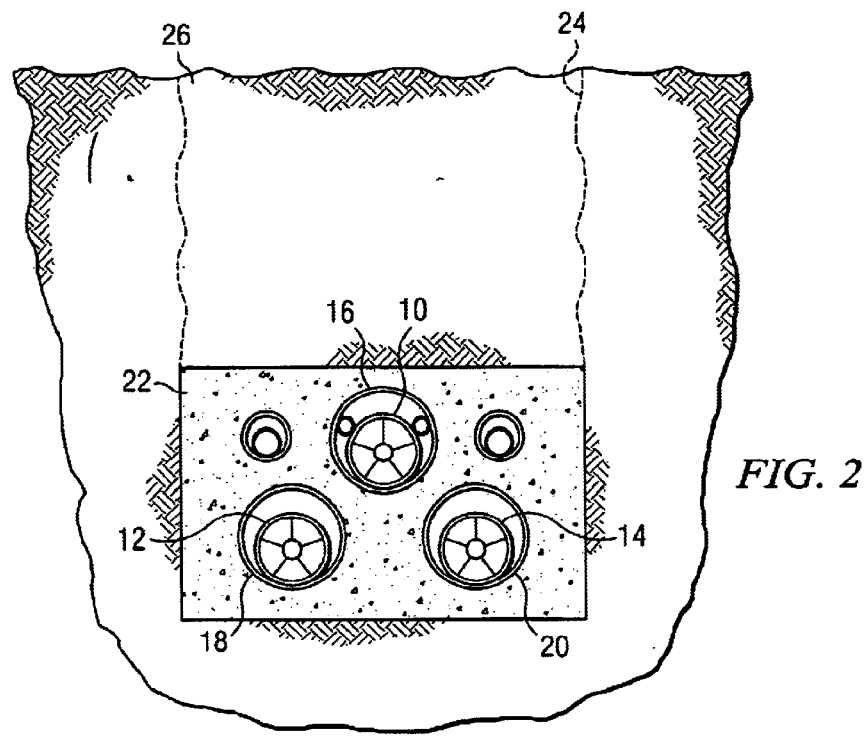
FIG. 2 is a sectional view, taken along line 2—2 of FIG. 1, of the HV cable installation showing the placement of large diameter guide ducts that have been pulled through the protective HV cable duct.

A typical underground HV cable installation is shown in FIG. 1 and FIG. 2 in which three HV cables 10, 12 and 14 are installed in protective underground ducts 16, 18 and 20, respectively. The HV cables are run from a first route station, for example a power transformer to a second route station, for example a man hole service access location, through a trench 24. The cables and protective ducts are confined in a concrete encasement 22 that is buried in a trench 24 at a depth of about 1.5 meters and which may extend over a cable trajectory of 2 km or more. The trench and encasement are covered by soil and backfill 26. The encasement is interrupted at a manhole 28 that provides access to the cables and the protective ducts.

The cables 10, 12 and 14 may be rated for safe operation at 69 KV or more, and are designed to operate at 90° C. to 120° C. The protective ducts are made of high-density polyethylene (HDPE) and have a diameter of about six inches (15.24 cm). The HV cable has a diameter of 4 inches (10.16 cm).

Figure 3:
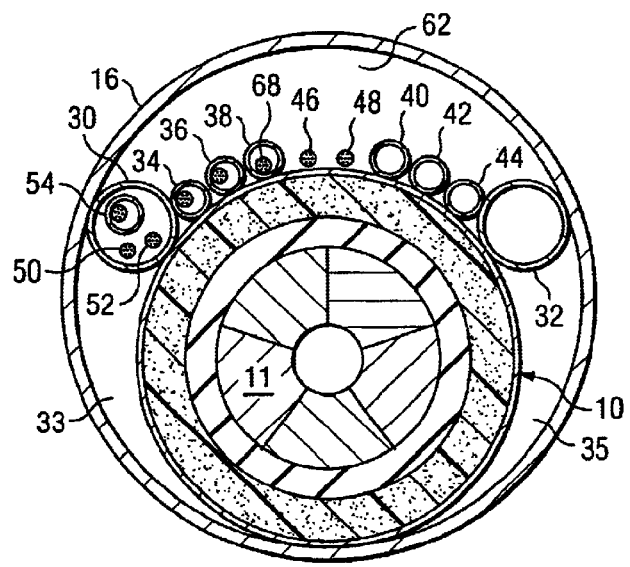
FIG. 3 is a sectional view of one of the HV cable installations in which a number of small diameter guide tubes and fiber optic cables have been installed by blowing.

A typical cable arrangement in a protective duct 16 is shown in FIG. 3. The hottest component in the cable is its metal conductor 11 and the thermal constraint on design is the temperature rating of the insulation 12. The cable is heated by $I^2R$ losses in the conductor, dielectric losses in the insulation, and $I^2R$ losses in the metallic sheath and/or eddy current losses in the sheath, depending on the earth grounding of the sheath. Heat is transferred through the cable insulation layer 38 and duct sidewall into the surrounding concrete encasement 22 and backfill soil 26. The efficiency of this heat transfer is therefore dependent on the various thermal resistances of the cable materials and the external backfill and soil, plus the ground ambient temperature and soil moisture conditions around the cables.

According to an important feature of the invention, large guide tubes 30, 32 having a diameter of 7–10 mm are pulled through the protective duct alongside the HV cable 10. Small guide tubes 34, 36, 38, 40 that have a diameter of ⅜ inch are installed (by pushing/blowing insertion) in the open annulus 62 between the large guide tubes. The large guide tubes are placed on opposite sides of the cable at wedging positions against the HV cable and the duct sidewall and thereby block movement of the small guide tubes. Similarly, fiber optic cables 46, 48 are laid (by pushing/blowing insertion) directly on the top surface of the HV conductor and thus are prevented from dropping into the constricted spaces 33, 35 near the bottom of the duct. Each restricted space has the shape of a sharp cusp in profile, and forms a narrow cusp-shaped pocket that could trap and seize the small diameter guide tubes and fiber optic cables, thus hindering blowing installation.

The fiber optic cables, if they should become wedged between the HV cable and the duct sidewall, could be crushed or pinched by reactive jerking movement of the HV cable caused by electromagnetic forces acting on it when it is suddenly energized by high voltage or a rapidly fluctuating load. The large guide tubes 30, 32 are inserted (by pulling with a rope through the duct) on opposite sides of the HV cable (as shown in FIG. 3) to block movement of the small fiber optic cables and guide tubes and prevent them from falling into the cusp-shaped pockets 34, 36.

The guide tube 30 is run in the duct with optical fibers 50, 52 and a smaller guide tube 54 (with fiber) already installed for DTS profile measurement, or optionally, for telecom service. The other guide tube 32 is installed empty, and can be used for later installation of fiber.

Referring again to FIG. 1, a cable launching unit 56 is set up adjacent the man-hole 28, where an open end of the existing HV duct 16 is exposed. A supply of new fiber optic cable and small diameter guide tubes, usually consisting of thousands of meters, are coiled or wound on reels 57 positioned above ground. The cables and guide tubes are pulled from the reels and are fed into the cable launching unit 56, for example, by a combination pushing and blowing cable insertion equipment of the type sold by Sherman & Reilly, Inc. of Chattanooga, Tenn., or as shown in U.S. Pat. No. 4,850,569, to which reference is made for whatever details described therein as may be necessary for the full understanding of the operation of the pushing and blowing unit. A set of pressure rollers driven by a motor (not shown) pull the bundle through a feed-in opening of a pressurization chamber of the cable insertion unit.

Sources of compressed air and hydraulic power (or electric power) are coupled to the cable feeder 56. Preferably, the compressed air A is provided by a compressor 58 through delivery conduit 66 at 175 to 375 cubic feet per minute (CFM) and 90 to 175 pounds per square inch (PSI). For the small size cables, installed in the guide tubes, in principle a capacity of 50 cubic feet per minute is sufficient.

The compressed air, hydraulic source, and/or electric power are connected and initiated to pressurize the plenum and to activate the hydraulic system and the control system. Compressed air A flows at high speed along the cables and guide tubes, propelling the loose bundle of guide tubes and fiber cables through a lead-in duct 60. The actuator is switched on to provide hydraulic fluid (or compressed air or electric power) to the motors, and the drive wheels rotate, advancing the cables and guide tubes through the lead-in conduit 60 down into the manhole.

There the cables and guide tubes are fed into the open annulus 62 of the HV duct 16, in the space lying above the HV cable 10 and beneath the duct sidewall. The lead-in conduit 60 is sealed against the HV duct by a flexible shroud fitting 64, whereby all of the pressurized airflow is directed into the HV duct. Preferably, the guide tubes and fiber optic cable are arranged in a loose bundle and are installed by a combination pushing and blowing as disclosed and claimed in U.S. Pat. No. 6,572,081 entitled "Installation of Guide Tubes in a Protective Duct," and assigned to the assignee of the present invention. The pushing/blowing action is continued until the cables and guide tubes reach the next access station.

Figure 4:
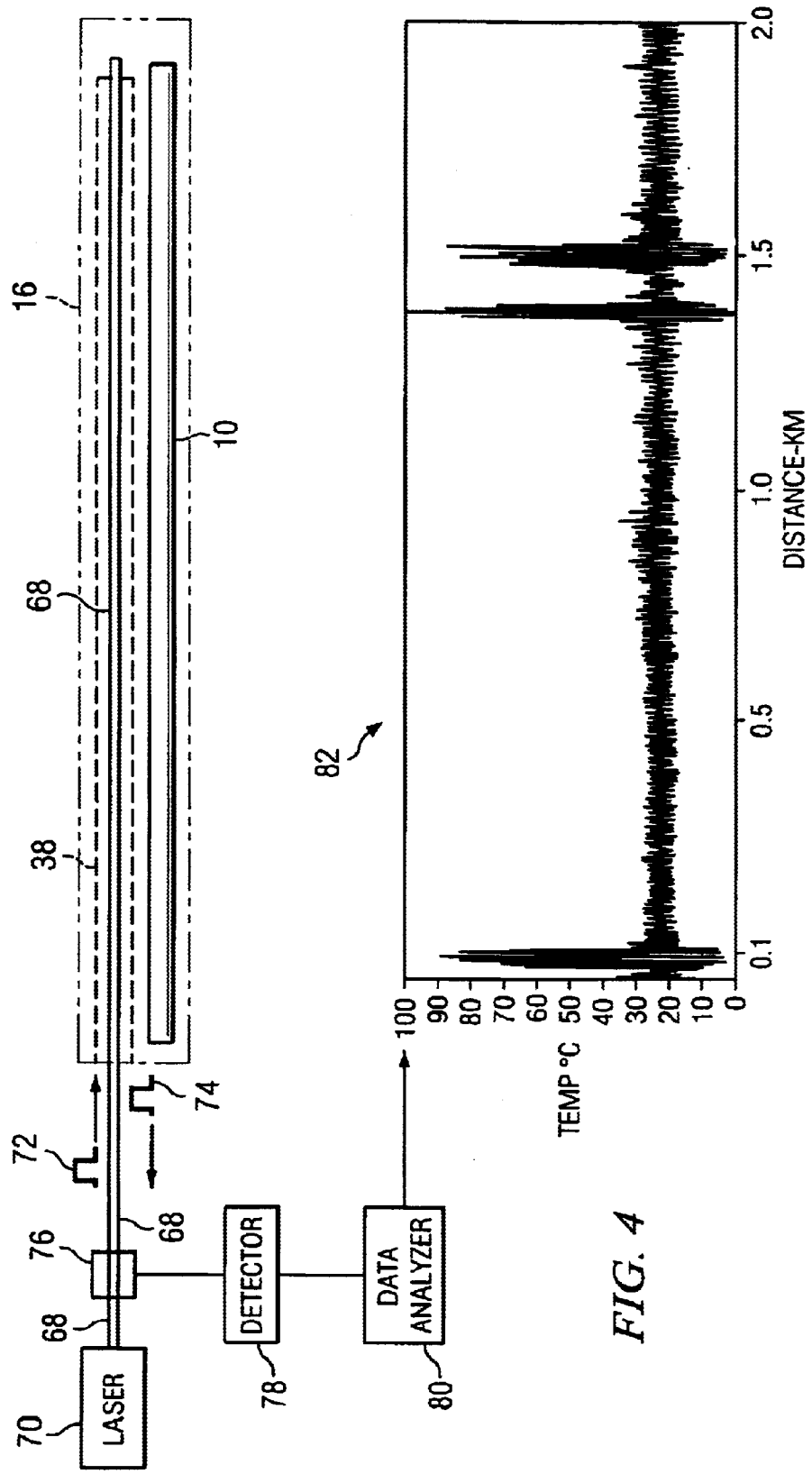
FIG. 4 is a simplified schematic block diagram showing the fiber optic cable being used in DTS measurement of the temperature profile of the HV cable installation shown in FIG. 3.

Referring now to FIG. 4, after blowing has been completed, the installation equipment is removed and the distributed temperature sensing equipment is connected to a selected one of the optical fiber cables, for example cable 68 contained within the small diameter guide tube. A laser 70 generates a pulse of light 72 that travels through the fiber, and a reflected pulse 74 of back scattered laser light returns. The pulses are output via a coupler 76 to a detector 78 and to an analyzer 80 where the time delay and the intensity ratio values are calculated. The ratio of the Stokes shifted and the anti-Stokes shifted portions of the Raman back scattering light represent the sensed temperature along the HV cable.

The calculated values are correlated and then printed on paper strip chart 82 to provide a permanent record of the temperature profile for a particular date and time. The correlated values can also be monitored on a data display screen (CRT).

A significant advantage provided by the present invention is the ability to identify existing cable routes that should be retrofitted or upgraded thus allowing the utility to lengthen the life span of the cable, deferring capital expenditures until it is absolutely necessary. The present invention also permits new fiber technologies to be easily and inexpensively installed in existing protective cable ducts, taking advantage of new advances in fiber technology. Moreover, the unused fiber capacity can be sold or leased to sister communications groups or they can be marketed to outside telecom companies.

We claim:

1. A method for monitoring the temperature profile of a high voltage cable that has been installed in a protective duct extending from a first route station to a second route station comprising the steps:

installing a length of fiber optic cable in the protective duct space and extending the fiber optic cable along the high voltage cable between the first and second route stations;

allowing the fiber optic cable to reach thermal equilibrium with the high voltage cable;

conducting pulses of light through the fiber optic cable;

detecting temperature-responsive light scattering phenomenon occurring in the fiber optic cable;

converting changes in the light scattering phenomenon into signals that are proportional to temperature; and recording the changes of temperature that correspond with various light scattering locations along the fiber optic cable.

2. The temperature profile monitoring method as set forth in claim 1, wherein the step of installing the fiber optic cable is performed by arranging the fiber optic cable and one or more guide tubes in a loose bundle, and propelling the bundle through the protective duct space at least in part by fluid drag forces.

3. The temperature profile monitoring method as set forth in claim 1, including the step of installing first and second large diameter guide tubes in the protective duct space prior to installation of the fiber optic cable, and placing the large diameter guide tubes on opposite sides of the high voltage cable, respectively, in wedging contact positions against the high voltage cable and duct sidewall, and then installing the fiber optic cable in the protective duct space bounded by the high voltage cable, the first and second large diameter guide tubes and the protective duct sidewall.

4. The temperature profile monitoring method as set forth in claim 1, wherein the fiber optic cable installation is performed by first running the fiber optic cable in a guide tube, and then propelling guide tube and fiber optic cable through the protective duct space at least in part by fluid drag forces.

5. The temperature profile monitoring method as set forth in claim 1, wherein the fiber optic cable installation step is performed by first running a guide tube through the protective duct space and then running the fiber optic cable through the guide tube.

* * * * *